United States Patent [19]

Nakamura et al.

[11] 4,004,563

[45] Jan. 25, 1977

[54] SPARK IGNITION ENGINE USING LEAN AIR-FUEL MIXTURE

[75] Inventors: Norihiko Nakamura, Mishima; Fujio Nakayama, Toyota, both of Japan

[73] Assignee: Toyota Jidosha Kogyo Kabushiki Kaisha, Toyota, Japan

[22] Filed: Nov. 26, 1974

[21] Appl. No.: 527,301

[30] Foreign Application Priority Data

Aug. 24, 1974 Japan .............................. 49-97354

[52] U.S. Cl. .................. 123/191 S; 123/32 SP; 123/32 K

[51] Int. Cl.² ........................................ F02B 19/12

[58] Field of Search ....... 123/32 ST, 32 SP, 32 SA, 123/191 S, 191 SP, 32 K, 37

[56] References Cited

UNITED STATES PATENTS

| | | | |
|---|---|---|---|
| 1,778,182 | 10/1930 | Bullington | 123/191 SP |
| 1,782,395 | 11/1930 | Bullington | 123/191 SP |
| 1,812,197 | 6/1931 | Bullington | 123/191 SP |
| 2,118,058 | 5/1938 | Riley | 123/191 SP |

FOREIGN PATENTS OR APPLICATIONS

| | | | |
|---|---|---|---|
| 612,150 | 1/1961 | Canada | 123/191 S |
| 586,737 | 4/1925 | France | 123/191 SP |

*Primary Examiner*—Charles J. Myhre
*Assistant Examiner*—William C. Anderson
*Attorney, Agent, or Firm*—Stevens, Davis, Miller & Mosher

[57] ABSTRACT

In a spark-ignition engine of the type having a main combustion chamber and an auxiliary combustion chamber so as to ignite the lean air-fuel mixture, a passage intercommunicating between the main and auxiliary combustion chambers has a bent portion between the ends thereof, and the spark gap of a spark plug is placed at or in the vicinity of the bent portion in the passage.

6 Claims, 3 Drawing Figures

SPARK IGNITION ENGINE USING LEAN AIR-FUEL MIXTURE

BACKGROUND OF THE INVENTION

The present invention relates to an improvement of an internal combustion engine of the type having a main combustion chamber and an auxiliary combustion chamber so as to use the lean air-fuel mixture.

In order to decrease the content of the pollutants or toxic emissions such as carbon monoxide, unburnt hydrocarbons (HC), and nitrogen oxides (NOx) in the exhaust gases discharged from the internal combustion engines, there has been devised and demonstrated such a method as using the lean air-fuel mixture; that is, the air-fuel mixture with a high air-fuel ratio. However, because of its poor flamability and its low speed of combustion, the use of the lean air-fuel mixture generally results in the drop in engine efficiency and in the increase in fuel consumption rate (g/horsepower.-hour).

To overcome these problems, there have been devised and demonstrated the internal combustion engines of the type having a main combustion chamber and an auxiliary combustion chamber communicated through a passage with the main combustion chamber. The air-fuel mixture compressed in the auxiliary combustion chamber is first ignited so that the combustion products or gases under an extremely high pressure may be injected through the passage at a high speed into the main combustion chamber. Therefore the air-fuel mixture in the main combustion chamber may be burnt quickly so that the speed of combustion in the main combustion chamber may be increased and the engine efficiency may be considerably improved.

However, the passage between the main and auxiliary combustion chambers must be relatively small in dimension so as to ensure an expected efficiency so that the complete scavenging of the auxiliary combustion chamber in the suction stroke is difficult to be attained. As a result, residual combustion products inevitably remain in the auxiliary combustion chamber. The residual combustion products dilute the air-fuel mixture which is pushed into the auxiliary combustion chamber through the passage from the main combustion chamber in the compression stroke so that the good ignitability of the mixture in the auxiliary combustion chamber by a spark plug cannot be ensured. To overcome this problem, various methods have been proposed. According to one method of the type disclosed in SAE paper No. 700491, the auxiliary combustion chamber is provided with a fuel injection nozzle so that a rich air-fuel mixture which has a good ignitability may be formed within the auxiliary combustion chamber. According to another prior method, the auxiliary combustion chamber is provided with an auxiliary suction valve so that an easily combustible air-fuel mixture may be formed within the auxiliary combustion chamber by additionally charging the rich air-fuel mixture through the auxiliary suction valve. However, the above two methods have a common defect that two air-fuel mixtures of different air-fuel ratios must be provided so that the fuel supply system is inevitably complex in construction, resulting in the difficulty in the control of the fuel supply and the increase in cost.

SUMMARY OF THE INVENTION

In view of the above, one of the objects of the present invention is to provide an improved internal combustion engine of the type having an auxiliary combustion chamber which engine is simple in construction yet ensures the stabilized ignition of the lean air-fuel mixture in the auxiliary combustion chamber.

Briefly stated, the novel features of the present invention reside in the fact that a passage intercommunicating between a main and auxiliary combustion chambers is provided with a sharply bent portion and that the gap of a spark plug is placed in the vicinity of the bent portion of the passage.

BRIEF DESCRIPTION OF THE DRAWING

Same reference numerals are used to designate similar parts throughout the figures.

DESCRIPTION OF THE PREFERRED EMBODIMENTS

Figure 1:
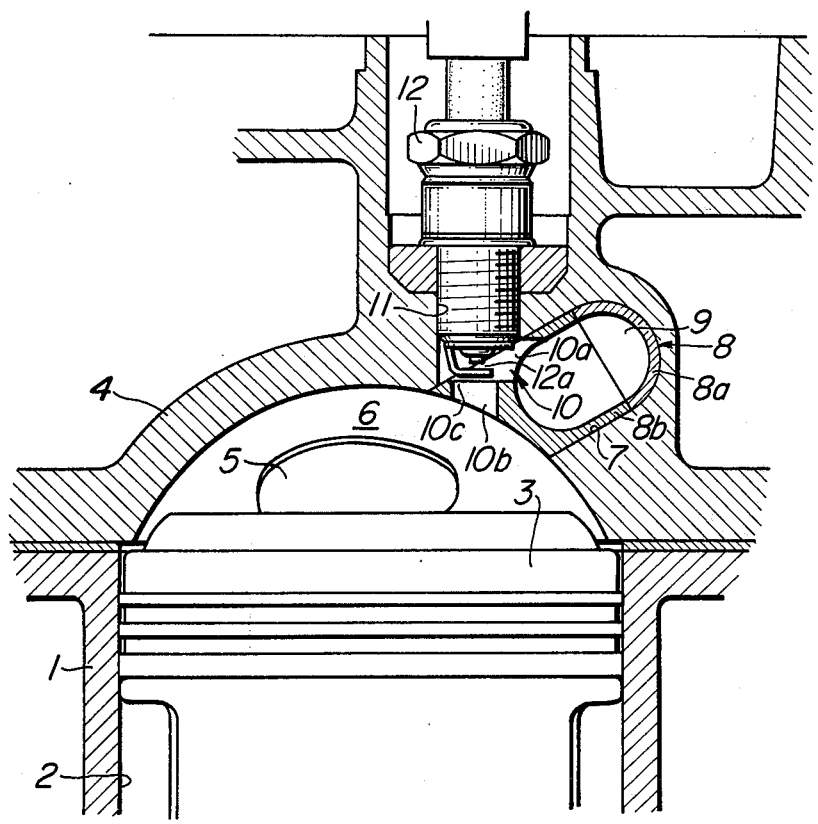
FIG. 1 is a schematic sectional view illustrating a first embodiment of the present invention.

First Embodiment, FIG. 1

Referring to FIG. 1 illustrating the first embodiment of the present invention, reference numeral 1 denotes a cylinder block; 2, a cylinder; 3, a piston; and 4, a cylinder head. A main combustion chamber 6 is formed between the inner surface of the cylinder head 4 and the top surface of the piston 3 at its upper dead point, and is provided with a suction valve 5 and an exhaust valve (not shown). Within the cylinder head and in the vicinity of the top portion of the main combustion chamber 6 is formed a recess 7 into which is fitted an auxiliary chamber element 8 consisting of parts 8a and 8b. Within the auxiliary chamber element 8 is defined an auxiliary combustion chamber 9. The reasons why the auxiliary chamber element 8 consists of two parts 8a and 8b are (a) that the inner surface of the auxiliary combustion chamber 9 may be smoothly machined so as to increase its resistance to heat and (b) that part 8b through which a passage 10 intercommunicating between the main combustion chamber 6 and the auxiliary combustion chamber 9 is formed may be made of a material capable of sufficiently withstanding the high temperature in the passage 10. The passage 10 consists of a first passage 10a extending through the part 8b from the auxiliary combustion chamber 9 to the outer surface of the part 8b and a second passage 10b extending through the part 8b from the main combustion chamber 6 to the outer surface of the part 8b. A spark plug 12 is screwed into a hole 11 formed in the cylinder head 4 communicated with the passages 10a and 10b. The spark gap 12a of the spark plug 12 is placed in the vicinity of the intersection between the passages 10a and 10b; that is, the sharply bent portion 10c in the passage 10.

The lean air-fuel mixture drawn into the cylinder 2 through the suction valve 5 in the suction stroke is pushed into the auxiliary combustion chamber 9 through the passage 10 from the main combustion chamber 6 as the piston 3 is lifted in the compression stroke. The combustion products produced in the previous combustion stroke which have remained in the passage 10 are carried away into the auxiliary combustion chamber 9 by the flow of the lean air-fuel mixture through the passage 10. Thus no post combustion gas remains around the spark gap 12a of the spark plug 12 at the moment of the ignition which takes place immediately before the completion of the compression stroke. Therefore the misfire due to the residual post combustion gas may be completely eliminated.

Figure 2:
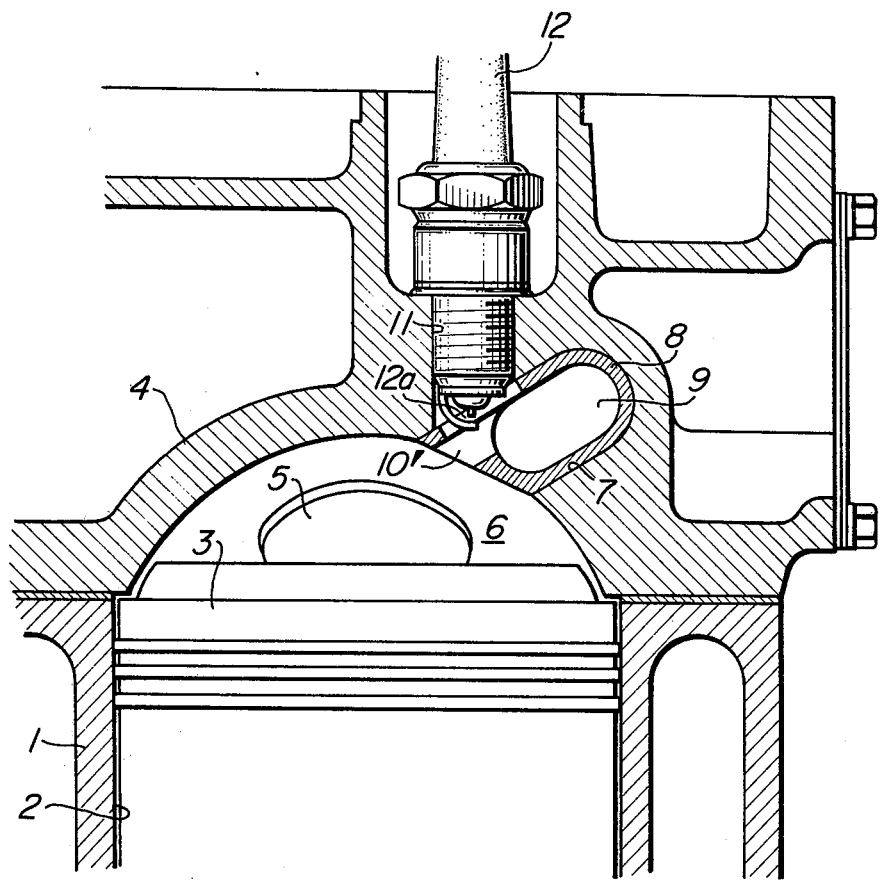
FIG. 2 is a view used for the explanation of the novel features thereof in comparison with the prior art.

According to the present invention, very important features and advantages may be attained due to the fact that the sharply bent portion 10c is formed in the passage 10. That is, in order to attain the high combustion speed as well as the effective combustion, the combustion gases from the auxiliary chamber 9 must be widely scattered through the passage 10 into the main combustion chamber 6. To this end, the length of the passage 10 must be reduced as practically as possible. However, in the prior art, a straight passage 10' is formed as shown in FIG. 2, and its length is inevitably increased because the spark-plug gap of the spark plug 12 must be placed within the passage 10'. As a result, the flow of the combustion gases flowing through the long straight passage 10' becomes almost a laminar flow so that the combustion gases cannot be widely scattered into the main combustion chamber 6, thus resulting in the decrease in combustion efficiency. Moreover the combustion gases injected through the straight passage 10' concentrate on a limited portion on the top of the piston 3, thereby causing local heating thereof. However, according to the present invention, the passage 10 is bent sharply at 10c as described above so that the flow of the combustion gases is much disturbed and becomes turbulent. Because of this turbulent flow, the combustion gases may be widely distributed in the main combustion chamber 6. Thus the combustion efficiency may be remarkably increased while the local heating of the piston 3 may be positively prevented. Since the gap 12a is placed at the bent portion 10c in the passage 10, the flow of the lean air-fuel mixture flowing from the main combustion chamber through the passage 10 into the auxiliary combustion chamber 9 is suitably decelerated so that the misfire due to the extinction of the spark caused by the air-fuel mixture flowing at a high speed through the gap, may be prevented.

Figure 3:
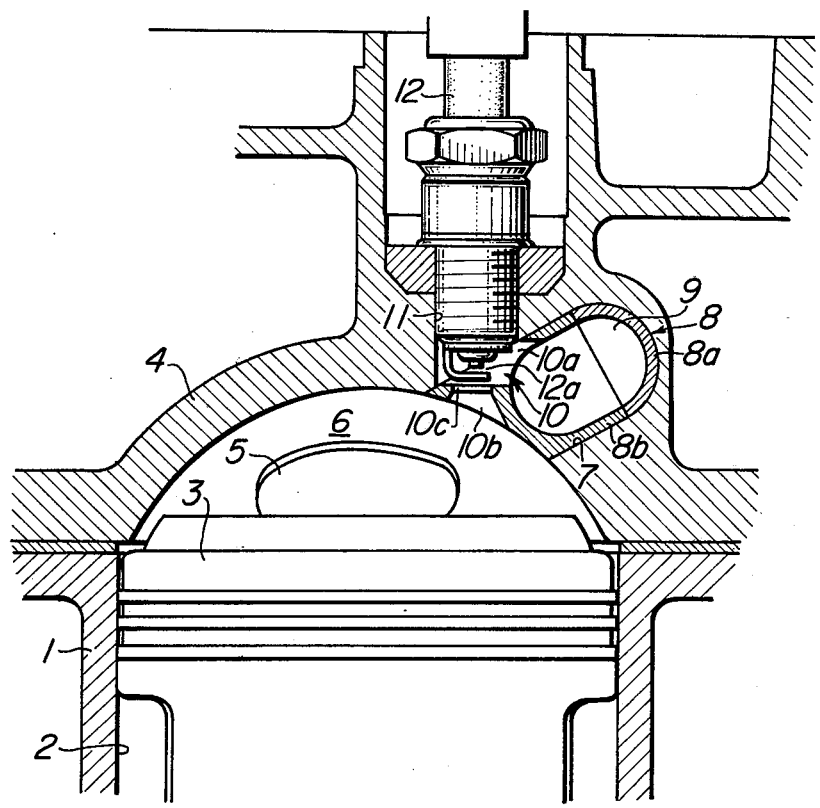
FIG. 3 is a schematic sectional view illustrating a second embodiment of the present invention.

Second Embodiment, FIG. 3

The second embodiment shown in FIG. 3 is substantially similar in construction to the first embodiment shown in FIG. 1 except that the passage 10b is diverged toward the main combustion chamber 6 so that the turbulent flow of the combustion gases produced at the bent portion 10c in the passage 10 may be more smoothly and widely scattered into the main combustion chamber 6. Thus, the combustion efficiency may be further increased while local heating of the piston 3 may be more positively prevented.

What is claimed is:

1. An internal combustion engine comprising a cylinder, a cylinder head attached to one end of said cylinder, a piston slidably fitted within said cylinder, a main combustion chamber defined between the inner surface of said cylinder head and the top surface of said piston, a recess provided on the inner surface of said cylinder head, an auxiliary chamber element securely fitted into said recess and defining therein an auxiliary combustion chamber, a passage means communicating said auxiliary combustion chamber with said main combustion chamber, and a spark plug having its spark gap exposed in said passage means, whereby a part of the air-fuel mixture sucked into said main combustion chamber is pushed through said passage means into said auxiliary combustion chamber in the compression stroke and ingnited by said spark plug and the flame thus produced burns through said passage means the air-fuel mixture in said main combustion chamber, the improvement in which said passage means comprises a first passage which opens into said auxiliary combustion chamber and a second passage which opens into said main combustion chamber, said first and second passages intersecting at an angle with each other.

2. An internal combustion engine as set forth in claim 1, wherein said spark gap of the spark plug is adjacent the intersection of said first and second passages.

3. An internal combustion engine as set forth in claim 1, wherein said second passage diverges toward said main combustion chamber.

4. An internal combustion engine as set forth in claim 1, wherein said auxiliary chamber element comprises a first part on the side of said main combustion chamber and a second part on the side of said chamber head, said first part of the element being made of material having higher heat-resistance than that of said second part of the element.

5. An internal combustion engine as set forth in claim 1, wherein said first and second passages intersect at an angle of substantially 90° to each other.

6. An internal combustion engine as claimed in claim 1, wherein the spark plug has its spark gap exposed in said passage means intermediate the ends thereof.

* * * * *